US012470076B2

(12) United States Patent
Bluhme et al.

(10) Patent No.: US 12,470,076 B2
(45) Date of Patent: Nov. 11, 2025

(54) CHARGING CONTAINER FOR STORING AND CHARGING AN IN-EAR AUDIO LISTENING DEVICE

(71) Applicant: Marshall Group AB, Stockholm (SE)

(72) Inventors: Axel Bluhme, Stockholm (SE); Daniel Andersson, Stockholm (SE); André Hedh, Stockholm (SE); Johan Anséhn, Stockholm (SE)

(73) Assignee: Marshall Group AB, Stockholm (SE)

( * ) Notice: Subject to any disclaimer, the term of this patent is extended or adjusted under 35 U.S.C. 154(b) by 820 days.

(21) Appl. No.: 17/755,374

(22) PCT Filed: Oct. 28, 2020

(86) PCT No.: PCT/EP2020/080234
§ 371 (c)(1),
(2) Date: Apr. 27, 2022

(87) PCT Pub. No.: WO2021/083931
PCT Pub. Date: May 6, 2021

(65) Prior Publication Data
US 2022/0376530 A1 Nov. 24, 2022

(30) Foreign Application Priority Data
Oct. 31, 2019 (SE) .................... 1951243-3

(51) Int. Cl.
H02J 7/00 (2006.01)
A45C 11/00 (2006.01)
(Continued)

(52) U.S. Cl.
CPC ............ H02J 7/0044 (2013.01); A45C 11/00 (2013.01); A45C 15/00 (2013.01); H04R 1/1025 (2013.01);
(Continued)

(58) Field of Classification Search
CPC ...................................... H02J 7/0044
(Continued)

(56) References Cited

U.S. PATENT DOCUMENTS 3,152,716 A * 10/1964 Feldhahn ........... A45C 13/1069
220/4.24
10,866,290 B2 * 12/2020 Ding ...................... H02J 50/10
(Continued)

FOREIGN PATENT DOCUMENTS

FR 2 955 137 A1 7/2011
WO WO 2018/079963 A1 5/2018
WO WO 2018/219094 A1 12/2018

OTHER PUBLICATIONS

International Search Report for Swedish Application No. 1951243-3 mailed Mar. 11, 2020 in 3 pages.
(Continued)

Primary Examiner — Jerry D Robbins
(74) Attorney, Agent, or Firm — Knobbe, Martens, Olson & Bear, LLP

(57) ABSTRACT

This disclosure presents a charging container (100) configured to store and charge an in-ear audio listening device (200A; 200B). The charging container (100) comprises a first part (110) and a second part (120). The second part (120) is attached to the first part (110) to form a lid for enclosing an in-ear audio listening device (200A; 200B) when the second part (120) faces the first part (110). At least a portion (122) of the second part (120) is flexible, e.g., made of a flexible material.

8 Claims, 4 Drawing Sheets

(51) Int. Cl.
  *A45C 15/00* (2006.01)
  *H04R 1/10* (2006.01)
(52) U.S. Cl.
  CPC ......... *A45C 11/001* (2025.01); *H02J 2310/22* (2020.01)
(58) Field of Classification Search
  USPC ....................................................... 320/115
  See application file for complete search history.

(56) References Cited

U.S. PATENT DOCUMENTS

| | | | | |
|---|---|---|---|---|
| 11,412,823 | B2* | 8/2022 | Wright | A45C 13/02 |
| 2005/0268433 | A1 | 12/2005 | Seidler | |
| 2006/0144077 | A1* | 7/2006 | Morris | F25D 3/08 |
| | | | | 62/530 |
| 2014/0002004 | A1 | 1/2014 | Farris-Gilbert | |
| 2014/0327401 | A1 | 11/2014 | Pickens et al. | |
| 2016/0105050 | A1* | 4/2016 | Chan | H02J 7/00 |
| | | | | 361/752 |
| 2016/0134141 | A1 | 5/2016 | Jentz et al. | |
| 2017/0064433 | A1 | 3/2017 | Hirsch et al. | |
| 2017/0104352 | A1 | 4/2017 | Stratton et al. | |
| 2018/0123367 | A1 | 5/2018 | Higgins et al. | |
| 2019/0069066 | A1 | 2/2019 | Song et al. | |
| 2019/0289383 | A1 | 9/2019 | Chawan et al. | |
| 2020/0068285 | A1* | 2/2020 | Dang | H04R 1/028 |
| 2020/0084532 | A1* | 3/2020 | Lo | H04R 1/1016 |
| 2020/0304899 | A1* | 9/2020 | Cramer | H02J 7/0045 |
| 2023/0269514 | A1* | 8/2023 | Cousins | H04R 1/1025 |
| | | | | 381/74 |

OTHER PUBLICATIONS

International Search Report and Written Opinion for Application No. PCT/EP2020/080234 mailed Jan. 25, 2021 in 14 pages.

* cited by examiner

CHARGING CONTAINER FOR STORING AND CHARGING AN IN-EAR AUDIO LISTENING DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR § 1.57. For example, this application claims priority to International PCT Application No. PCT/EP2020/080234, filed Oct. 28, 2020, which is an international application of Sweden Patent Application No. SE 1951243-3, filed Oct. 31, 2019, the entire content of each of which is incorporated herein by reference in its entirety and forms a part of this specification for all purposes.

TECHNICAL FIELD

The present disclosure generally relates to a charging container, also known as a charging case, for charging an in-ear audio listening device.

More specifically, the present disclosure relates to a charging container (or, charging case) configured to store and charge one or more in-ear audio listening devices.

BACKGROUND

Portable audio listening devices, such as in-ear audio listening devices, may be used with a wide variety of equipment such as portable media players, smart phones, tablet computers, laptop computers, stereo systems and other types of equipment. Portable audio listening devices have historically included one or more small speakers configured to be placed on, in, or near a user's ear, structural components that hold the speakers in place, and a cable that electrically connects the portable listening device to an audio source. Other portable audio listening devices can be wireless, i.e., these that do not include a cable and, instead, wirelessly receive a stream of audio data from a wireless audio source.

Certain users may perceive wireless portable audio listening devices as advantageous over wired portable audio listening devices. However, wireless portable listening devices, typically require one or more batteries, such as a rechargeable battery, that provides power to the wireless communication circuitry and other components of the device. Single use batteries need to be replaced when their charge is depleted while rechargeable batteries need to be periodically recharged. In addition, if the portable wireless listening device is a pair of wireless earbuds, the earbuds can be relatively small and easy to lose when not in use.

In view of the above, the U.S. Patent Application Publication US 2017/094394 A1 has proposed a case that can store and charge a portable listening device, such as a pair of wireless earbuds or other types of headphones.

SUMMARY

It is in view of the above considerations and others that the various embodiments of the present invention have been made.

It is a general object of embodiments of this disclosure to provide an alternative charging container, or charging case.

This general object has been addressed by the appended independent claim 1. Advantageous embodiments are defined in the appended dependent claims.

According to a first aspect, a charging container for charging an in-ear audio listening device is provided. Typically, the charging container has a size and form factor for accommodating an in-ear audio listening device. In other words, the charging container may be formed and sized to accommodate an in-ear audio listening device.

The charging container is configured to store and charge an in-ear audio listening device. For example, the charging container may be configured to store and charge one or more in-ear audio listening devices, such as a single set of two in-ear audio listening devices (e.g., intended for a left ear and a right ear, respectively).

The charging container comprises a first part and a second part. The second part is attached to the first part to form a lid for enclosing an in-ear audio listening device when the second part faces the first part. Furthermore, at least a portion of the second part is flexible.

The charging container differs from the disclosure of US 2017/094394 A1, i.a., in that at least a portion of the second part is flexible. The present disclosure recognizes the fact that it is advantageous to provide a second part, where at least a portion of this second part is flexible. For example, this has the advantage that—when an in-ear audio listening device is not stored in the charging container—the charging container (or, case) may become thinner than prior art cases such as the case disclosed in US 2017/094394 A1. This results in a portable charging container, which is increasingly pocket-friendly. In addition, the portion of the second part that is flexible provides a softness to the second part. For example, when the charging container is in a closed position a user may touch the softer portion of the second part (provided by the portion of the second part that is flexible) to confirm to himself or herself whether the in-ear audio listening device(s) is/are present or not within the charging container. This type of tactile feedback for confirming the presence or non-presence of the in-ear audio listening device(s) has not been offered by prior art cases such as the one disclosed in US 2017/094394 A1.

In some embodiments, at least a portion of the second part is made of a flexible material. In some embodiments, the whole or substantially the whole second part is made of a flexible material.

For example, the flexible material may comprise an elastic material.

Advantageously, but not necessarily, the flexible material may be air-permeable to form a breathable second part. Providing a breathable second part may, e.g., enable to keep the in-ear audio listening device(s) fresh if the in-ear audio listening device(s) is/are stored in the charging container for a long period of time. In addition, a breathable second part may extend the lifetime of the in-ear audio listening device(s) if the charging container is used frequently.

Additionally, or alternatively, the flexible material may be at least partly transparent. This may e.g. enable a user to at least partly view the in-ear audio listening device through the second part when the in-ear audio listening device is stored in the charging container. Furthermore, in some embodiments, this may enable a user to view a current status of the charging process when the stored in-ear audio listening device(s) is/are being charged. For example, when the charging container is in a closed position a user may view through the at least partly transparent portion of the second part to confirm to himself or herself whether the in-ear audio listening device(s) is/are present or not within the charging container. Additionally, in some embodiments, a user may confirm to himself/herself the status of a charging process (e.g., using Light Emitting Diodes (LEDs) located inside the charging container when in its closed position). This type of vision feedback has not been offered by prior art cases such as the one disclosed in US 2017/094394 A1.

In some embodiments, the flexible material may comprise one or more of the following: fabric, leather or artificial leather, a silicone-based material, etcetera.

In preferred embodiments, the second part is removably attached to the first part to form said lid. For example, the second part may be pivotally hinged with the first part. Advantageously, the second part may be pivotally hinged with the first part by means of a magnetic hinge. In one embodiment, the second part comprises a protruding hinge part at one of its sides, the protruding hinge part being provided with at least one first magnetic element; and the first part comprises a recessed hinge part at one of its sides, the recessed hinge part being provided with at least one second magnetic element; wherein the recessed hinge part is shaped to receive the protruding hinge part to form the magnetic hinge through magnetic attraction established between said first and second magnetic elements when the protruding hinge part is positioned in the recessed hinge part. The provision of removable attachment by means of a magnetic hinge may be advantageous in that the charging container may become relative easy to manufacture. Also, this may allow for separating the first and second parts from each other which, in turn, may be advantageous if/when a user desires to clean the charging container. In addition, allowing for separating the first and second parts may be advantageous from a sustainability point of view. For example, assuming that one of the parts is destroyed or is malfunction, a user may replace only the destroyed or malfunction part instead of replacing the complete charging container. Additionally, or alternatively, removable attachment by means of a magnetic hinge may allow for a durable solution, because, compared to e.g. mechanical hinges, magnetic hinges do not risk being worn out after long-term use to the same extent.

In alternative embodiments, the second part may be permanently (i.e., irremovably) attached to the first part to form said lid. For example, the second part may be pivotally hinged with the first part.

In the embodiments discussed above, the first part may comprise a molded part including a recess to receive the in-ear audio listening device for placement of the in-ear audio listening device. For example, the shape of the recess may advantageously correspond to the shape of the in-ear audio listening device. The charging container may for example be configured to charge the in-ear audio listening device when the in-ear audio listening device is positioned in said recess.

In some embodiments, the charging container may be formed and sized to accommodate said in-ear audio listening device.

In some embodiments, said in-ear audio listening device includes two wireless in-ear audio listening devices, e.g. a single set of two wireless earbuds.

The various embodiments discussed herein thus provide an improved charging container, or charging case, which is portable and increasingly pocket-friendly. In addition, some of the embodiments discussed herein may allow for tactile and/or vision feedback for confirming the presence or non-presence of the in-ear audio listening device(s) when the charging container is in its closed position.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION OF EMBODIMENTS

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements throughout the description.

As described earlier, some existing solutions for storing and charging an in-ear audio listening device may be perceived as inadequate by certain users. To address this, and in accordance with an aspect of this disclosure, a charging container, or charging case, for storing and charging an in-ear audio listening device is proposed. The charging container may be formed and sized to accommodate said in-ear audio listening device. According to this aspect, the charging container comprises a first part and a second part. The second part is attached to the first part to form a lid for enclosing an in-ear audio listening device when the second part faces the first part. Furthermore, at least a portion of the second part is flexible. An alternative charging container, or charging case, is hereby provided. The charging container differs from the disclosure of US 2017/094394 A1, i.a., in that at least a portion of the second part is flexible. The present disclosure recognizes the fact that it is advantageous to provide a second part, where at least a portion of this second part is flexible. For example, this has the advantage that—when an in-ear audio listening device is not stored in the charging container—the charging container (or, case) becomes thinner than prior art cases such as the case disclosed in US 2017/094394 A1. This results in a portable charging container, which is increasingly pocket-friendly. In addition, the portion of the second part provides a softness to the second part. For example, when the charging container is in its closed position a user may touch the softer portion of the second part (provided by the portion of the second part that is flexible) to confirm to himself or herself whether the in-ear audio listening device(s) is/are present or not within the charging container. This type of tactile feedback for confirming the presence or non-presence of the in-ear audio listening device(s) has not been offered by prior art cases such as the one disclosed in US 2017/094394 A1.

Figure 1A:
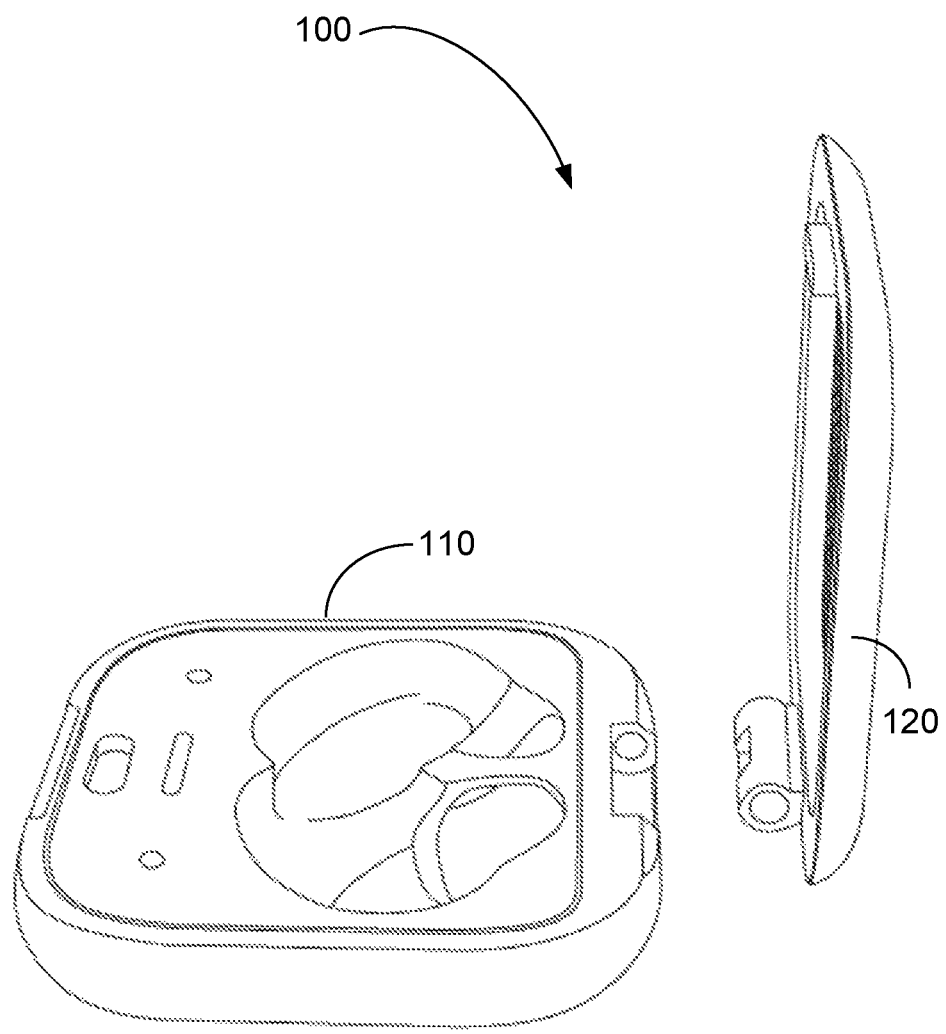
FIG. 1A is a perspective view of a first part and a second part according to an embodiment for forming a charging container.
Figure 1B:
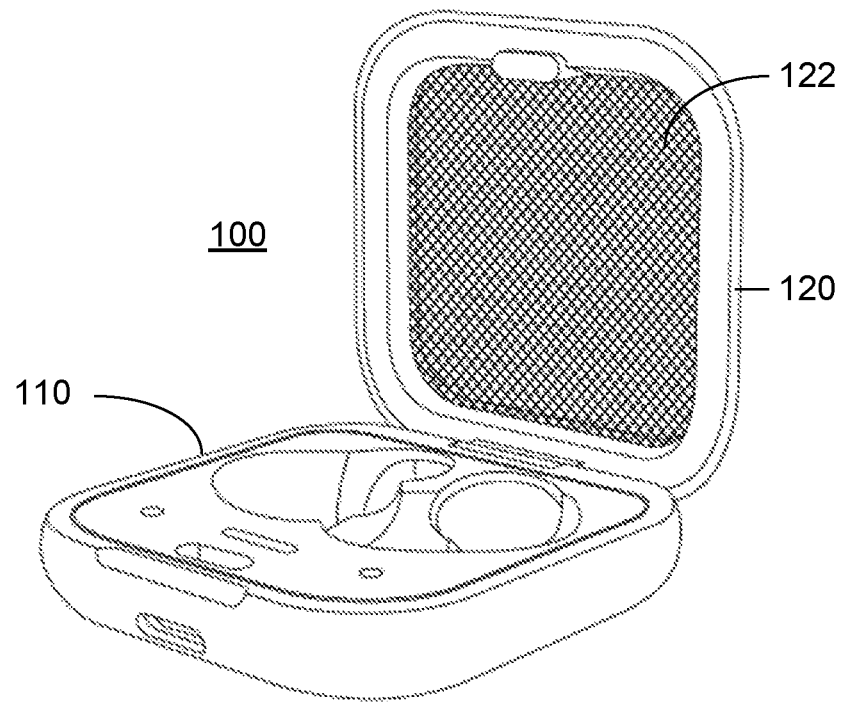
FIG. 1B is a perspective view of the second part of FIG. 1A being attached to the first part of FIG. 1A to form the charging container.
Figure 2:
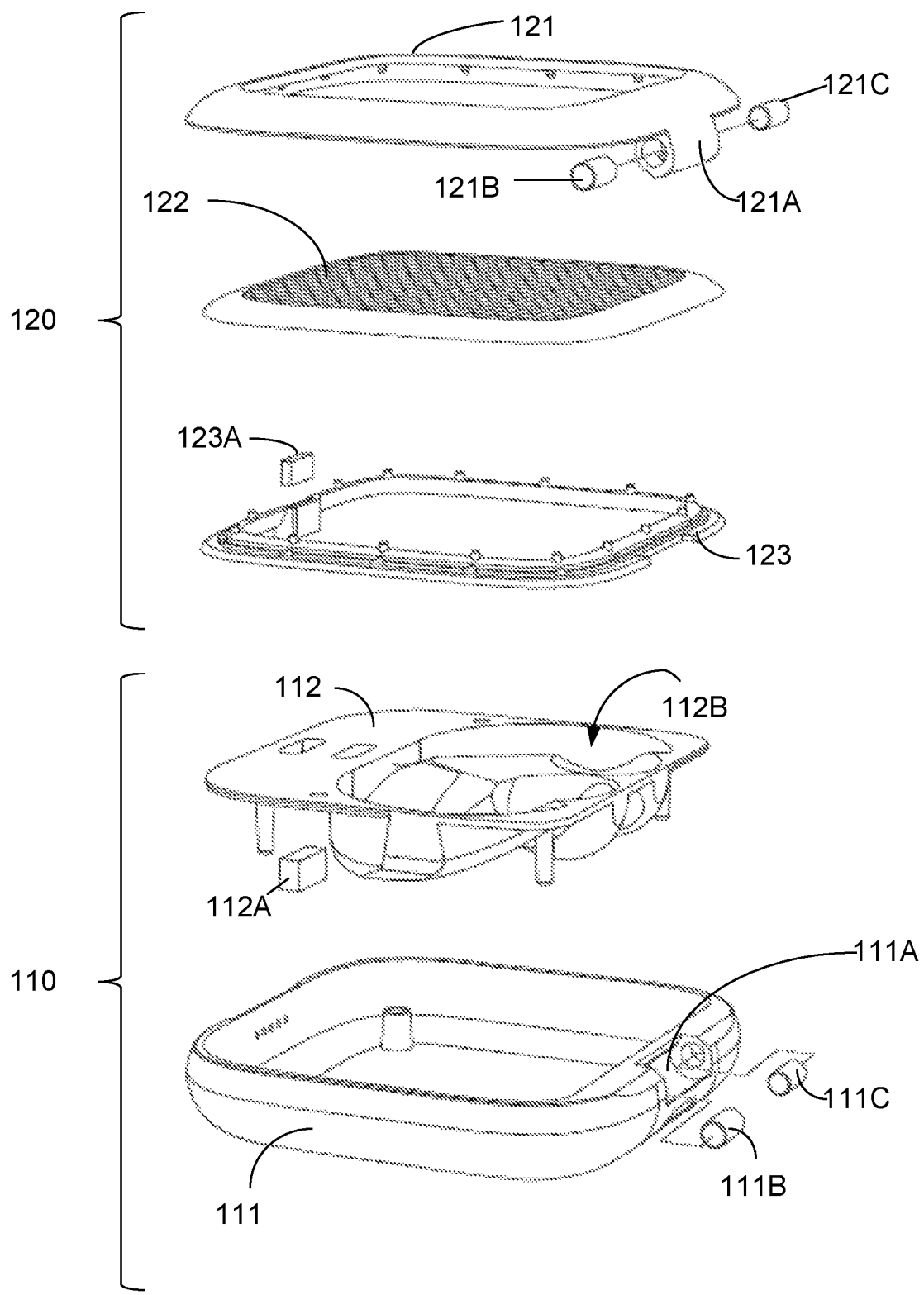
FIG. 2 is an exploded view of the charging container of FIGS. 1A-1C.

Reference will now be made to the figures in order to elucidate various embodiments of the present invention. FIGS. 1A-1B and FIG. 2 illustrate a preferred embodiment of a charging container for storing and/or charging one or more in-ear audio listening devices, e.g. a pair of wireless earbuds (e.g. a single set of two wireless earbuds). This embodiment is provided by way of example. It is to be understood that the scope of this disclosure is not limited to this specific example embodiment. Therefore, it should also be understood that numerous modifications and variations to the embodiment that would still fall within the scope of the appended claims are conceivable.

Figure 1C:
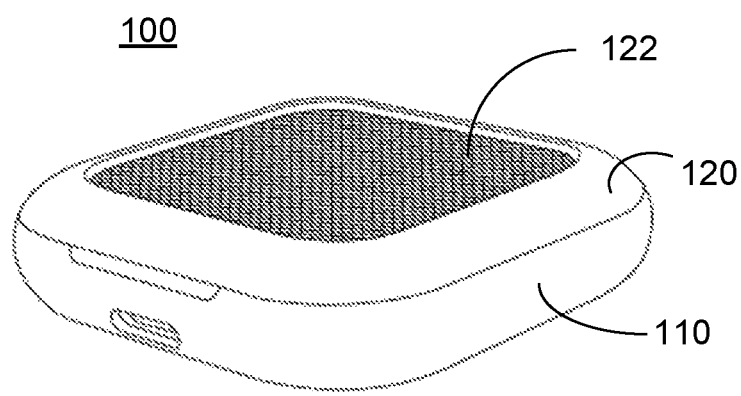
FIG. 1C is a perspective view of the charging container when the second part faces the first part for enclosing an in-ear audio listening device.

Reference is now made to FIGS. 1A-1C. As can be seen in FIG. 1A, a first part 110 and a second part 120 are provided. As is illustrated in FIG. 1B, the second part 120 may be removably attached to the first part 110 to form a charging container 100. As is further illustrated in FIG. 1C, the second part 120 is removably attached to the first part 110 to form a lid for enclosing the one or more in-ear audio listening devices when the second part 120 faces the first part 110. In other words, FIG. 1B illustrates the charging container in an open position and FIG. 1C illustrates the same charging container in a closed position. At least a portion 122 of the second part is flexible. For example, the portion 122 of the second part 120 may be made of a flexible material. In some embodiments, the whole or substantially the whole second part 120 is made of a flexible material.

It is advantageous to provide a second part, where at least a portion 122 of this second part 120 is flexible. For example, this has the advantage that—when an in-ear audio listening device is not stored in the charging container—the charging container 100 becomes thinner than prior art cases such as the case disclosed in US 2017/094394 A1. This results in a portable charging container, which is increasingly pocket-friendly. In addition, the portion of the second part provides a softness to the second part. For example, when the charging container is in a closed position a user may touch the softer portion of the second part (provided by the portion of the second part that is flexible) to confirm to himself or herself whether the in-ear audio listening devices is present or not within the charging container. This type of tactile feedback for confirming the presence or non-presence of the in-ear audio listening device(s) has not been offered by prior art cases such as the one disclosed in US 2017/094394 A1.

In FIGS. 1A-1C, the flexible material is exemplified as a fabric. The fabric may advantageously be a mesh fabric as disclosed in the figures. The mesh fabric may be elastic. Advantageously, the mesh fabric may be air-permeable to form a breathable second part 120. Providing a breathable second part 120 may, e.g., enable to keep the one or more in-ear audio listening devices fresh if the in-ear audio listening device(s) is/are stored in the charging container for a long period of time. In turn, this may be advantageous in that it may enable an extension of the lifetime of the in-ear audio listening device(s) if the charging container is used frequently.

Furthermore, the flexible material 122, exemplified by the mesh fabric in FIGS. 1A-1C may be at least partly transparent. This may e.g. enable a user to at least partly view the in-ear audio listening device(s) through the second part when the in-ear audio listening device(s) is/are stored in the charging container. Furthermore, in some embodiments, this may enable a user to view a current status of the charging process when the stored in-ear audio listening device(s) is/are being charged. As a mere example, when the charging container is in a closed position a user may view through the at least partly transparent portion of the second part 120 to confirm to himself or herself whether the in-ear audio listening device(s) is/are present or not within the charging container 100. Additionally, in some embodiments, a user may confirm to himself/herself the status of a charging process (e.g., using Light Emitting Diodes (LEDs) located inside the charging container when in its closed position). This type of vision feedback has not been offered by prior art cases such as the one disclosed in US 2017/094394 A1.

Reference is now made to FIG. 2, which illustrates an exploded view of an example implementation of the charging container 100 of FIGS. 1A-1C and FIG. 2.

In this embodiment, the second part 120 may include three portions, i.e. i) a first portion 121 sometimes referred to as a top portion or a top lid, ii) a second portion 122 which is flexible (e.g., provided with mesh fabrics 122), and iii) a third portion 123 sometimes referred to as lid insert portion (e.g., provided with a lid lock magnet 123A). Furthermore, in this embodiment, the first part 110 may include two portions, i.e. i) a first portion 111 sometimes referred as bottom portion or container bottom, and ii) container insert portion 112 (e.g., provided with a container lock magnet 112A adapted to form a magnetic lock function through magnetic attraction with the corresponding lid lock magnet 123A).

In the embodiment shown in FIG. 2, the second part 120 may be removably attachable to the first part 110 to form the charging container 100. For example, the second part 120 may be pivotally hinged with the first part 110 by means of a magnetic hinge 111B; 121B; 111C; 121C. In more detail, the second part 120 may comprise a protruding hinge part 121A at one of its sides. The protruding hinge part 121A may be provided with at least one first magnetic element 121A; 121B. In addition, the first part 110 may comprise a corresponding recessed hinge part 111A at one of its sides. The recessed hinge part 111A may be provided with at least one second magnetic element 111B; 111C. The recessed hinge part 111A may advantageously be shaped to receive the protruding hinge part 121A of the second part 120 to form the magnetic hinge 111B; 121B; 111C; 121C through magnetic attraction established between said first 111C; 121C through magnetic attraction established between said first magnetic element 111B; 111C and said second magnetic elements 121B; 121C when the protruding hinge part 121A is positioned in the recessed hinge part 111A. As can be seen in FIG. 2, the first part 110 may comprise a molded part (e.g. the portion 112) which includes a recess 112B to receive the in-ear audio listening device(s) for placement of the in-ear audio listening device(s). The molded part may be made of plastics. Advantageously, the shape of the recess 112B corresponds to the shape of the in-ear audio listening device(s).

It should be appreciated that the portion 112 could alternatively be another material, i.e. other than plastics. Conceivable material options include, for example, metal, glass, PC (polycarbonate), PC-ABS (polycarbonate-acrylonitrile butadiene styrene), ABS (acrylonitrile butadiene styrene), Nylon, TPU (thermoplastic polyurethane), TPE (thermoplastic elastomers).

In some embodiments, it is possible to provide a portion 112 which is flexible. For instance, this may avoid charging pins getting damage when a user, in certain use cases, would accidentally sit down on the charging container or drop the charging container while an in-ear audio listening device is stored and is being charged in the charging container 100.

Figure 3:
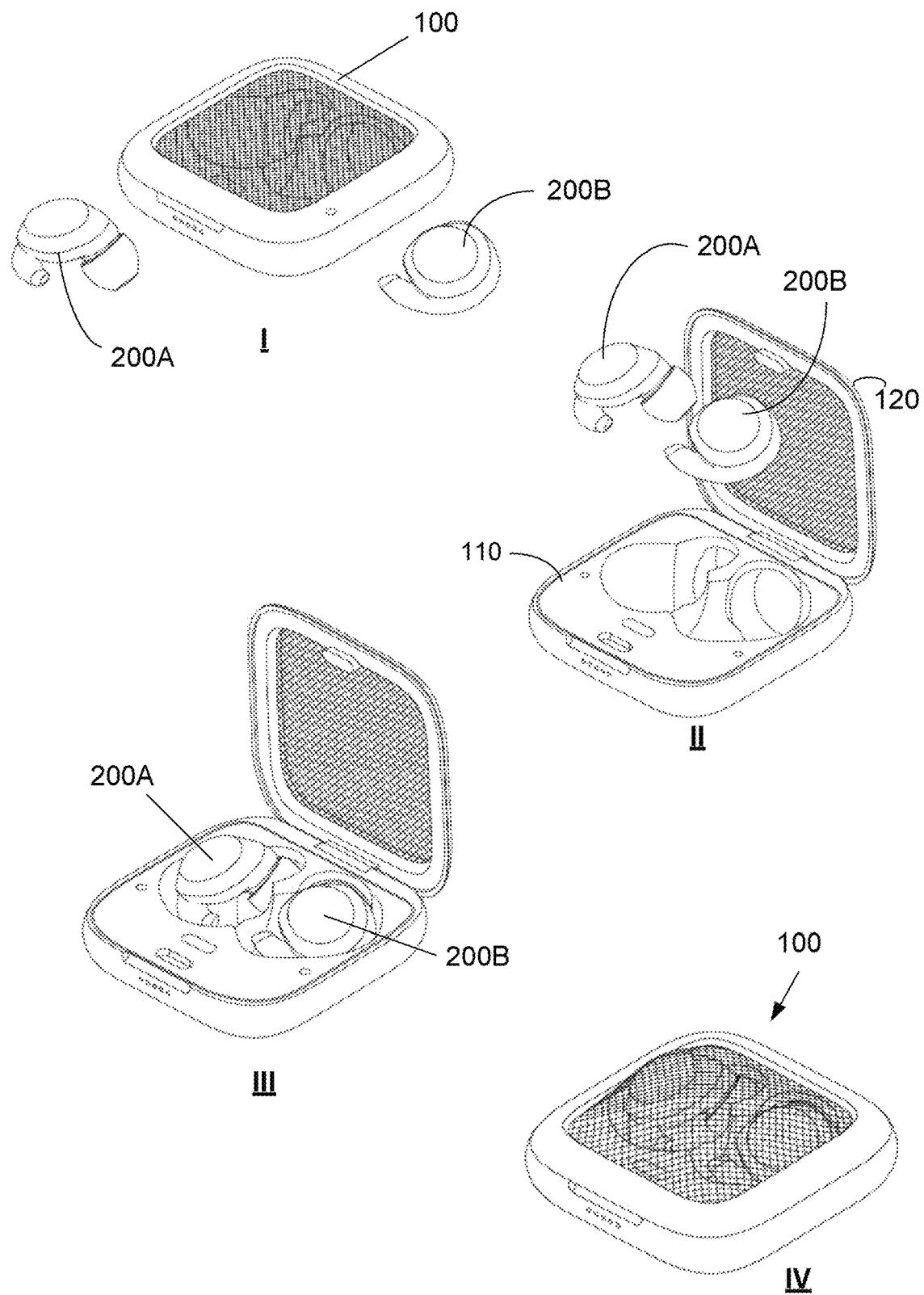
FIG. 3 illustrates a flow where two in-ear audio listening devices, exemplified by a pair of wireless earbuds, is being placed in the charging container of FIGS. 1A-1B.

Reference will now be made to FIG. 3, which schematically illustrates a flow or process I through IV when a user places his or her in-ear audio listening devices 200A, 200B (e.g., a pair of earbuds such as a single set of two wireless earbuds) in the charging container 100. In a first step I, the in-ear audio listening device(s) 200A, 200B is/are not placed in the charging container 100. In this closed position when the in-ear audio listening device(s) 200A, 200B is/are not stored in the charging container, the charging container 100 becomes relatively thin. This may result in a portable charging container, which is increasingly pocket-friendly. In the next two subsequent steps II and III, respectively, the in-ear audio listening device(s) 200A, 200B is/are placed in the recess 112B of the first part. As can be seen in the third step III, the shape (and size) of the recess 112B may advantageously correspond to the shape of the in-ear audio listening device(s). In some embodiments, the charging container 100 is advantageously configured to charge the in-ear audio listening device(s) 200A, 200B when the in-ear audio listening device(s) 200A, 200B is/are positioned in the recess 112B, as shown in the third step III. In a fourth step IV, a user may enclose the in-ear audio listening device(s) in its closed position. As can be seen, the charging container 100 is still relatively thin, while the stored in-ear audio listening device(s) 200A, 200B can also be kept in place in the charging container. This results in a portable charging container, which is pocket-friendly also when the in-ear audio listening device(s) is/are stored in the charging container 100.

Modifications and other variants of the described embodiment will come to mind to one skilled in the art having benefit of the teachings presented in the foregoing description and associated drawings. Therefore, it is to be understood that the present invention is not limited to the specific examples described hitherto and that modifications and other variants are intended to be included within the scope of this disclosure. Accordingly, a person skilled in the art would recognize numerous variations and modification to the described embodiments that would still fall within the scope of the appended claims. In the following, various conceivable options or alternatives to provide a second part 120, at least a portion 122 of which is flexible, will be disclosed. For example, the choice of material of the portion 122 may depend on various needs and/or demands and should preferably be tested and evaluated for each specific case or scenario. In the embodiments discussed above, at least a portion 122 of the second part 120 is flexible. This was exemplified by a flexible material in the form of a mesh fabric. Other types that are flexible, or bendable, are also conceivable.

Conceivable material options to provide at least a portion 122 of the second part 120 to be flexible may include:
Fabrics
Silicone or silicone-based materials
Non-woven textile materials (e.g. microfiber)
Leather
Artificial leather (Polyurethane (PU)/Protein/Polyvinal chloride (PVC) leather)
TPE;
TPU;
Rubber In some implementations, it may be advantageous to provide transparent or semi-transparent materials. Possible transparent or semi-transparent materials may include:
Fabrics
Plastics/elastomers such as PC, Polyethylene terephthalate (PET), TPU, PVC or similar
Leather or artificial leather (PU/Protein/PVC leather)
Perforated metal Furthermore, in order to achieve a desired degree of transparency it is possible to provide at least some of the above-mentioned materials as mesh-type materials.

Additional, or alternative, modifications and other variants of the described embodiment are also possible. For example, while an embodiment has been described herein with reference to a second part 120, which is advantageously removably attachable to the first part 110, it is possible to provide a charging container 100 wherein the second part 120 is instead permanently attached to the first part 110. If so, the second part 120 may for example be pivotally hinged with the first part 110 to form the charging container.

Still further, while this disclosure has focused on a charging container 100 which is configured to charge the in-ear audio listening device(s) 200A, 200B, e.g., when the in-ear audio listening device is positioned in a recess 112B of the first part 110, it should be appreciated that many of the technical effects and advantages of a second part 120 are equally possible for a container for storing in-ear audio listening device(s) 200A, 200B, i.e. without the provision of charging. Accordingly, the present disclosure equally proposes a case for storing an in-ear audio listening device, the case comprising: a first part; and second part attached to the first part to form a lid for enclosing an in-ear audio listening device when the second part faces the first part; wherein at least a portion of the second part is flexible. At least a portion of the second part is made of a flexible material. The whole or substantially the whole second part may be made of the flexible material. For instance, a flexible material may comprise an elastic material. The flexible material may be air-permeable to form a breathable second part. Additionally, or alternatively, the flexible material may be at least partly transparent. The flexible material may comprise one or more of the following: fabric, leather or artificial leather, a silicone-based material. In some implementations, the second part may be removably attached to the first part to form said lid. For example, the second part may be pivotally hinged with the first part. In some implementations, the second part may be pivotally hinged with the first part by means of a magnetic hinge. For example, the second part may comprise a protruding hinge part at one of its sides, the protruding hinge part being provided with at least one first magnetic element; and the first part may comprise a recessed hinge part at one of its sides, the recessed hinge part being provided with at least one second magnetic element, wherein the recessed hinge part may be shaped to receive the protruding hinge part to form the magnetic hinge through magnetic attraction established between said first and second magnetic elements when the protruding hinge part is positioned in the recessed hinge part. In other alternative implementations, the second part may instead be permanently attached to the first part to form said lid. The second part may for example be pivotally hinged with the first part. In the implementations discussed above, the first part may comprise a molded part including a recess to receive the in-ear audio listening device for placement of the in-ear audio listening device. The shape of the recess may, for instance, correspond to the shape of the in-ear audio listening device.

As mentioned above, modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while embodiments of the invention have been described with reference to in-ear audio listening devices, such as wireless earbuds, persons skilled in the art will appreciate that some aspects or embodiments of the invention may equivalently be applied to similar in-ear devices including, for example, ear protectors. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims (or embodiments), these may possibly advantageously be combined, and the inclusion of different claims (or embodiments) does not imply that a certain combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A charging container configured to store and charge a pair of wireless earbuds, the charging container comprising:
 a first part comprising a molded part including a recess to receive the pair of wireless earbuds for placement of the pair of wireless earbuds, wherein a shape of the recess corresponds to a shape of the pair of wireless earbuds; and
 a second part attached to the first part to form a lid for enclosing the pair of wireless earbuds when the second part faces the first part, and wherein at least a portion of the second part is flexible,
 wherein the charging container is configured to charge the pair of wireless earbuds when the pair of wireless earbuds is positioned in said recess,
 wherein the second part is removably attached to the first part to form the lid,
 wherein the second part is pivotally hinged with the first part by a magnetic hinge, and wherein:
  the second part comprises a protruding hinge part at a side of the second part, the protruding hinge part being provided with at least one first magnetic element; and
  the first part comprises a recessed hinge part at a side of the first part, the recessed hinge part being provided with at least one second magnetic element; and wherein
  the recessed hinge part is shaped to receive the protruding hinge part to form the magnetic hinge through magnetic attraction established between the first and second magnetic elements when the protruding hinge part is positioned in the recessed hinge part.

2. The charging container according to claim 1, wherein said pair of wireless earbuds includes a set of two wireless earbuds.

3. The charging container according to claim 1, wherein at least a portion of the second part is made of a flexible material.

4. The charging container according to claim 3, wherein the whole second part is made of the flexible material.

5. The charging container according to claim 3, wherein the flexible material comprises an elastic material.

6. The charging container according to claim 3, wherein the flexible material is air-permeable to form a breathable second part.

7. The charging container according to claim 3, wherein the flexible material is at least partly transparent.

8. The charging container according to claim 3, wherein the flexible material comprises one or more of the following: fabric, leather, artificial leather, or a silicone-based material.

* * * * *